(12) United States Patent
Drees et al.

(10) Patent No.: US 8,370,485 B2
(45) Date of Patent: Feb. 5, 2013

(54) ISOLATING LOCAL PERFORMANCE VARIATION IN WEBSITE MONITORING

(75) Inventors: Timothy P. Drees, Del Mar, CA (US); Lenny Rachitsky, San Diego, CA (US); Doug J. Taylor, Solana Beach, CA (US)

(73) Assignee: Neustar, Inc., Sterling, VA (US)

( * ) Notice: Subject to any disclaimer, the term of this patent is extended or adjusted under 35 U.S.C. 154(b) by 0 days.

(21) Appl. No.: 12/902,619

(22) Filed: Oct. 12, 2010

(65) Prior Publication Data

US 2011/0029662 A1 Feb. 3, 2011

Related U.S. Application Data

(63) Continuation of application No. 12/479,152, filed on Jun. 5, 2009, now Pat. No. 7,814,202, which is a continuation of application No. 11/142,890, filed on Jun. 1, 2005, now Pat. No. 7,546,368.

(51) Int. Cl.
*G06F 15/173* (2006.01)

(52) U.S. Cl. .......................... 709/224; 709/202; 709/203

(58) Field of Classification Search .................. 709/203, 709/224, 235, 202, 223
See application file for complete search history.

(56) References Cited

U.S. PATENT DOCUMENTS

| | | | | | |
|---|---|---|---|---|---|
| 6,049,819 | A * | 4/2000 | Buckle et al. | ................ | 709/202 |
| 6,314,463 | B1 * | 11/2001 | Abbott et al. | ................ | 709/224 |
| 6,317,786 | B1 * | 11/2001 | Yamane et al. | ................ | 709/224 |
| 6,449,739 | B1 * | 9/2002 | Landan | ........................ | 714/47 |
| 6,493,695 | B1 * | 12/2002 | Pickering et al. | ............... | 706/47 |
| 6,502,131 | B1 * | 12/2002 | Vaid et al. | ..................... | 709/224 |
| 6,550,024 | B1 * | 4/2003 | Pagurek et al. | ................. | 714/47 |
| 6,564,342 | B2 * | 5/2003 | Landan | .......................... | 714/48 |
| 6,591,298 | B1 * | 7/2003 | Spicer et al. | ................... | 709/224 |
| 6,636,983 | B1 * | 10/2003 | Levi | .................................. | 714/4 |
| 6,738,813 | B1 * | 5/2004 | Reichman | ..................... | 709/224 |
| 6,973,489 | B1 * | 12/2005 | Levy | ............................ | 709/224 |
| 6,973,490 | B1 * | 12/2005 | Robertson et al. | ............ | 709/224 |
| 7,051,339 | B2 * | 5/2006 | Deverill et al. | ................ | 719/328 |
| 7,277,938 | B2 * | 10/2007 | Duimovich et al. | .......... | 709/224 |
| 7,346,678 | B1 * | 3/2008 | Zhu et al. | ....................... | 709/224 |
| 7,353,272 | B2 * | 4/2008 | Robertson et al. | ............ | 709/224 |
| 7,373,376 | B1 * | 5/2008 | Hamer et al. | .................. | 709/203 |
| 7,392,321 | B1 * | 6/2008 | Wolf et al. | ..................... | 709/232 |
| 7,546,368 | B2 * | 6/2009 | Drees et al. | ..................... | 709/224 |
| 7,711,751 | B2 * | 5/2010 | Kelley et al. | ................... | 707/791 |
| 7,814,202 | B2 * | 10/2010 | Drees et al. | ..................... | 709/224 |
| 7,822,844 | B2 * | 10/2010 | Oulu et al. | ..................... | 709/224 |
| 2002/0198985 | A1 * | 12/2002 | Fraenkel et al. | .............. | 709/224 |
| 2003/0046383 | A1 * | 3/2003 | Lee et al. | ........................ | 709/224 |
| 2004/0202309 | A1 * | 10/2004 | Baggenstoss et al. | ... | 379/265.06 |
| 2006/0062376 | A1 * | 3/2006 | Pickford | .................. | 379/265.12 |
| 2006/0277001 | A1 * | 12/2006 | Drees et al. | .................... | 702/188 |
| 2007/0271375 | A1 * | 11/2007 | Hwang | ......................... | 709/224 |
| 2008/0189406 | A1 * | 8/2008 | Shen | ............................... | 709/224 |
| 2009/0240805 | A1 * | 9/2009 | Drees et al. | .................... | 709/224 |
| 2010/0217801 | A1 * | 8/2010 | Leighton et al. | .............. | 709/203 |

* cited by examiner

*Primary Examiner* — Michael Won
(74) *Attorney, Agent, or Firm* — Procopio, Cory, Hargreaves & Savitch LLP

(57) ABSTRACT

Systems and methods are provided for isolating performance variation in website monitoring. A set of geographically diverse monitoring agents are identified and a subset of baseline agents is selected from these monitoring agents. The baseline agents are those agents that are geographically close to the target website or otherwise enjoy reliable communications with the target website and are therefore less affected by network latencies. The frequency at which a target website is monitored is weighted in favor of the baseline agents in order to get an accurate baseline metric for the target website while also obtaining information regarding global accessibility of the website from the geographically disperse monitoring agents. The variations in sample frequency can be optimized for each particular set of baseline agents. The set of baseline agents can be pre-assigned or dynamically identified based on an analysis of the performance variation from each of the monitoring agents.

23 Claims, 6 Drawing Sheets

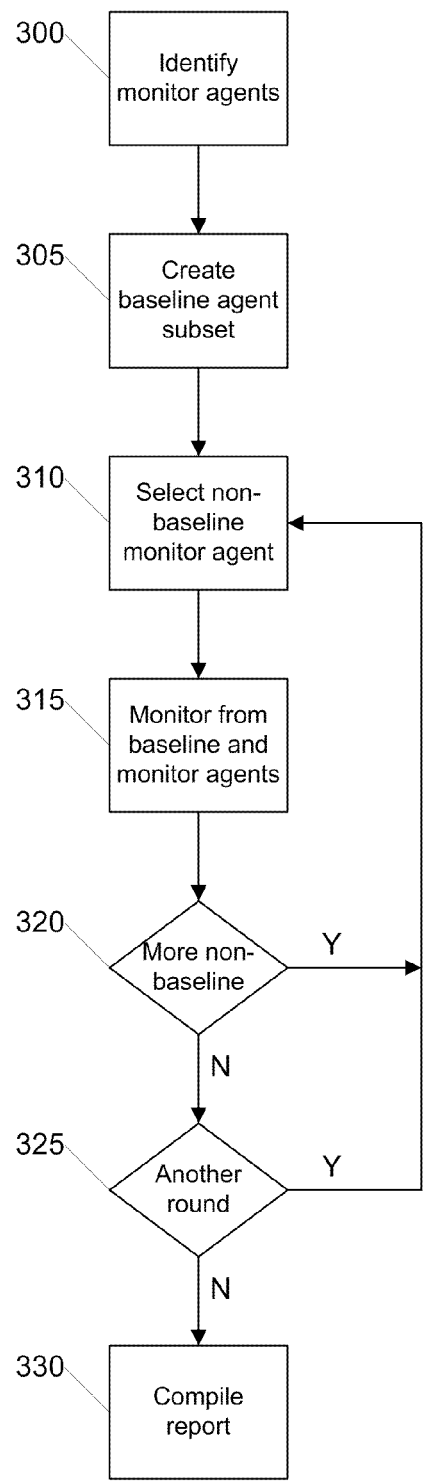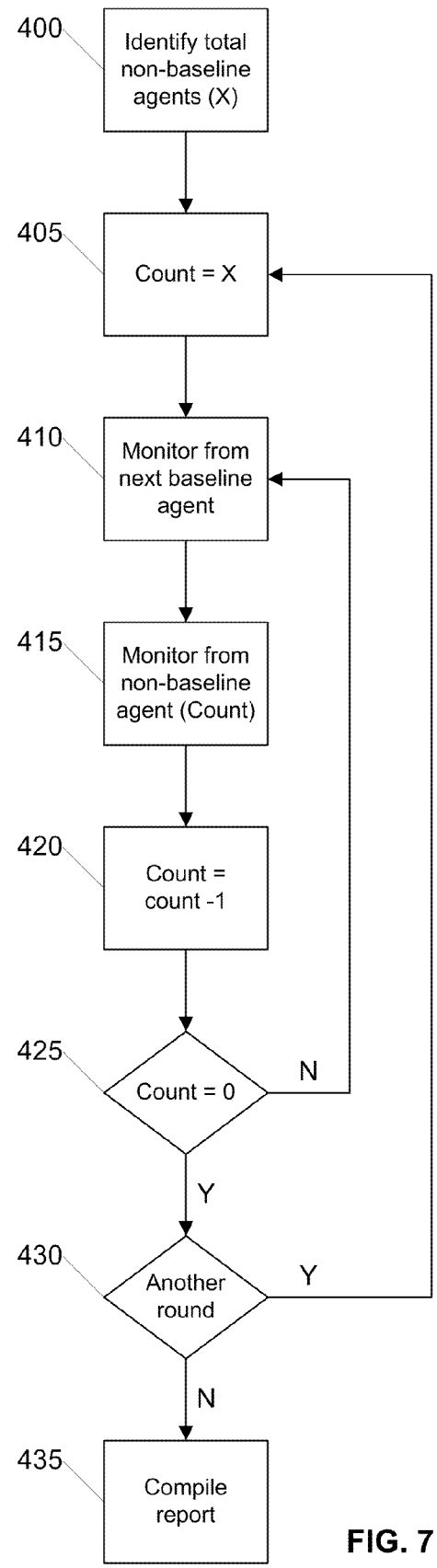
FIG. 6
FIG. 7

ISOLATING LOCAL PERFORMANCE VARIATION IN WEBSITE MONITORING

RELATED APPLICATION

The present application is a continuation of U.S. patent application Ser. No. 12/479,152 filed 5 Jun. 2009, which is a continuation of U.S. patent application Ser. No. 11/142,890 filed 1 Jun. 2005, each of which is incorporated herein by reference in its entirety.

BACKGROUND

1. Field of the Invention

The present invention generally relates to website monitoring and more particularly relates to systems and methods for isolating local performance variation in website monitoring.

2. Related Art

Conventional website monitoring systems and methods suffer from the inclusion of inaccurate or misleading data that is recorded when monitoring a target website. The conventional systems and methods monitor a target website from geographically disperse locations in order to obtain global information related to the performance of the target website. However, latency in the networks over which the monitoring traffic flows is often a significant cause of delays that are reported in the data that represents the performance of the target website. These latency delays confound the conventional website monitoring systems and adversely affect the accuracy of the information being reported by such conventional systems. Accordingly, what is needed is a system and method for website monitoring that overcomes these significant problems found in the conventional systems as described above.

SUMMARY

The presently described invention therefore provides a system and a method that employs geographically diverse monitoring agents in any website monitoring effort. These agents are divided into monitoring agents and baseline agents. The baseline agents are those agents that are geographically close to the target website or otherwise have reliable transmission to and from the target website and are less affected by network latencies. The frequency at which a target website is monitored is weighted in favor of the baseline agents in order to get an accurate baseline metric for the target website while also obtaining information regarding global accessibility of the website. The variations in sample frequency can be optimized for each particular set of baseline agents.

Additionally, the set of baseline agents can be pre-assigned for a particular website monitoring effort or the set may be selected in real time based on a sample of all monitoring agents in order to dynamically identify the subset of monitoring agents with reliable access to the target website. The dynamic assignment of baseline agents may also be as a result of a performance variation analysis that measures the difference in load times across a data set of multiple samples for a particular monitoring agent rather than measuring the average raw load time for the monitoring agent. The performance variation analysis may also be separately implemented to substantially reduce the effect of network latency on the results of any individual monitoring agent (baseline or non-baseline).

BRIEF DESCRIPTION OF THE DRAWINGS

The details of the present invention, both as to its structure and operation, may be gleaned in part by study of the accompanying drawings, in which like reference numerals refer to like parts, and in which:

FIG. 6 is a flow diagram illustrating an example process for increasing the sample rate for baseline agents according to an embodiment of the present invention;

FIG. 7 is a flow diagram illustrating an alternative example process for increasing the sample rate for baseline agents according to an embodiment of the present invention;

DETAILED DESCRIPTION

Certain embodiments as disclosed herein provide for a set of baseline agents to be selected from a group of monitoring agents to isolate local performance variation in website monitoring. For example, one method as disclosed herein allows for dynamic selection of baseline agents and a higher sampling frequency from baseline agents versus monitoring agents. The higher sampling frequency provides more accurate information regarding the website performance and diminishes the monitoring information sampled from monitoring agents experiencing network latency for an overall improved website monitoring effort. Additionally, the effects of network latency can be substantially reduced by application of performance variance, which measures response times at an individual monitoring agent relative to historical response times for the same individual agent.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
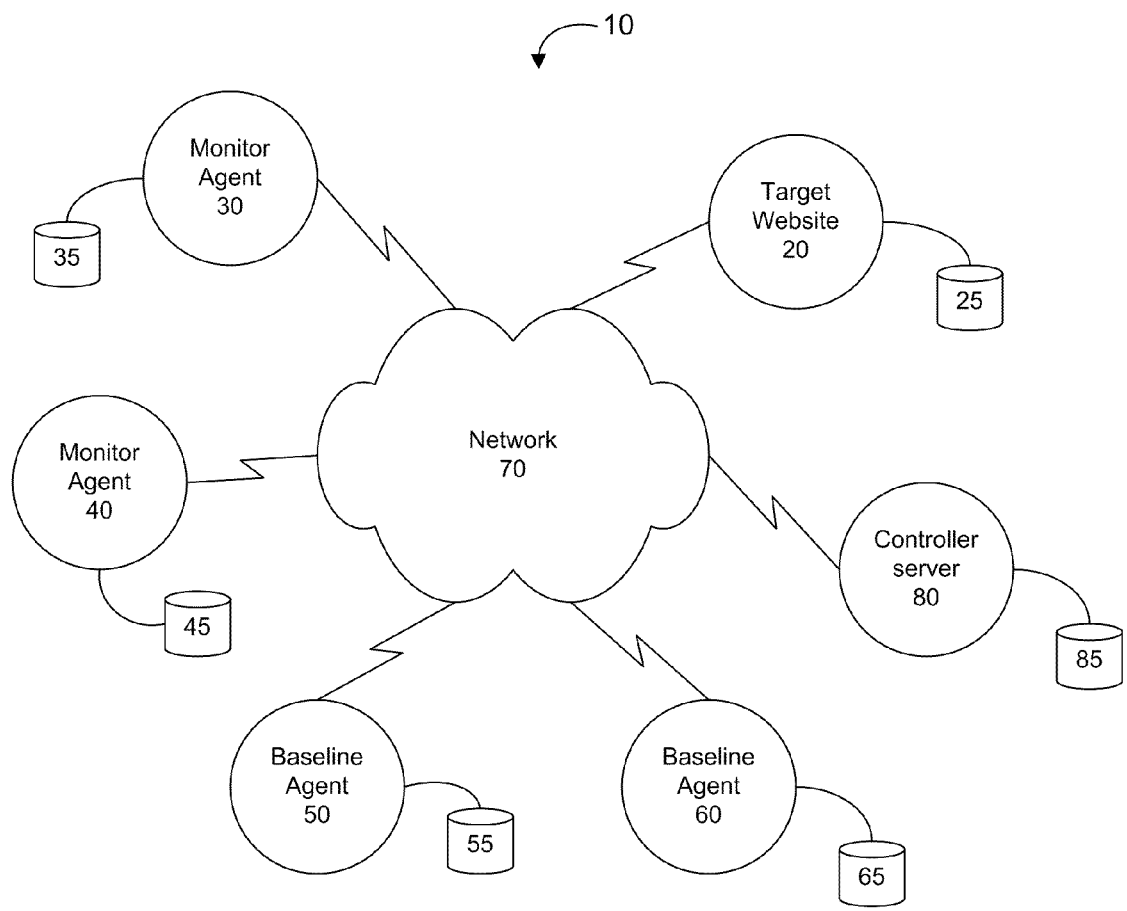
FIG. 1 is a network diagram illustrating an example system for website monitoring according to an embodiment of the present invention.

FIG. 1 is a network diagram illustrating an example system 10 for website monitoring according to an embodiment of the present invention. In the illustrated embodiment, the system 10 comprises a target website 20 that is communicatively coupled with a plurality of monitor agents including agent 30 and agent 40 and a plurality of baseline agents including agent 50 and agent 60 and a controller server 80 via a network 70. The target website is configured with a data storage area 25. Similarly, each of the aforementioned agents is configured with a data storage area such as data storage areas 35, 45, 55, and 65, respectively, and the controller server 80 is also configured with a data storage area 85.

In one embodiment, each agent may be physically situated in a different geographic location. For example, monitor agent 30 may be in Chicago and monitor agent 40 may be in New York while baseline agent 50 may be in Los Angeles and baseline agent 60 may be in Phoenix. In this example embodiment, the target website 20 may be in San Diego. In alternative embodiments, the various baseline agents (e.g., 50 and 60) may be closer in physical proximity to the target website 20 than the various monitor agents (e.g., 30 and 40). Alternatively, the various baseline agents may be relatively closer to the target website 20 with respect to network latency. An example of this may include a baseline agent that is physically far away but networked to the target website via a two hop fiber optic network connection while a monitor agent is physically in the same city as the target website but is networked to the target website via an intermittent dialup connection.

In one embodiment, the system 10 may be implemented and controlled by the controller server 80. The controller server 80 provides overall management of the system 10 during website monitoring and orchestrates the various monitor agents and baseline agents and receives their monitoring information and compiles that information into related reports that are meaningful for website monitoring.

As shown in the diagram of system 10, the target website 20 is communicatively coupled to the various agents via a network 70. The network 70 may be any of a variety of private or public networks. The network 70 may be a packet switched network or a circuit switched network. The network 70 may be a local area network ("LAN") or a wide area network ("WAN") and may be implemented over a wired or wireless physical network medium. Network 70 may also be any combination of networks such as the ubiquitous Internet.

Figure 2:
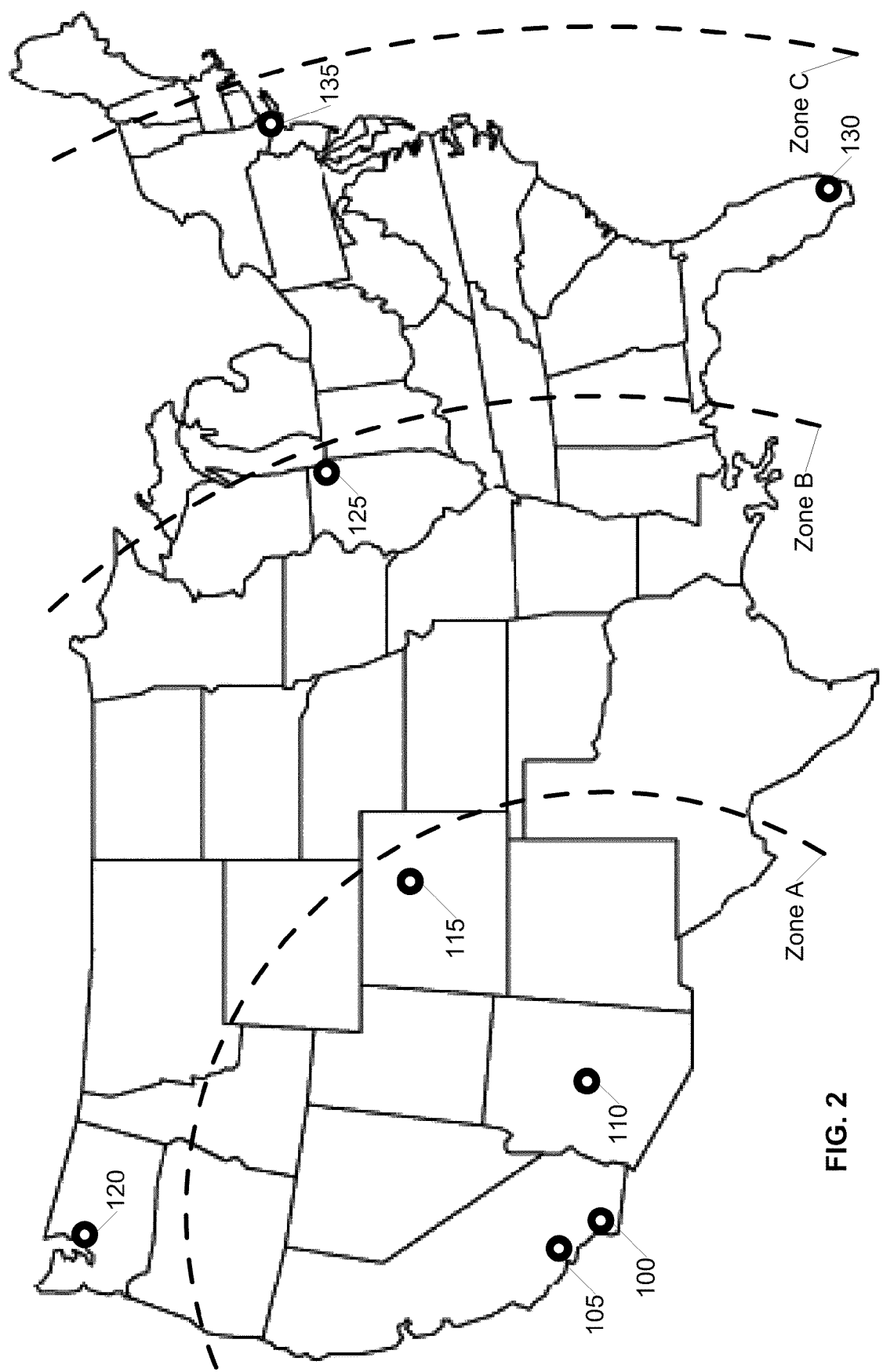
FIG. 2 is a geographical map diagram illustrating an example distribution of monitoring agents according to an embodiment of the present invention.

FIG. 2 is a geographical map diagram illustrating an example distribution of monitoring agents according to an embodiment of the present invention. In the illustrated embodiment, a target website 100 is located in San Diego. Within the geographic proximity of Zone A are baseline agents 105 in Los Angeles, 110 in Phoenix, and 115 in Denver. Within the geographic proximity of Zone B are monitor agents 120 in Seattle and 125 in Chicago. Within the geographic proximity of Zone C are monitor agents 130 in Miami and 135 in New York. Various additionally zones may be logically identified.

The primary distinction between the various agents are that those agents in Zone 1 are baseline agents and those agents outside of Zone 1 are monitor agents. The various Zones may be geographical in nature as shown in the illustrated embodiment or they may represent the latency times of the various agents. Identification of zones is optional but may be helpful in this description for understanding the different nature of monitor agents and baseline agents and the identification process for baseline agents.

Figure 3:
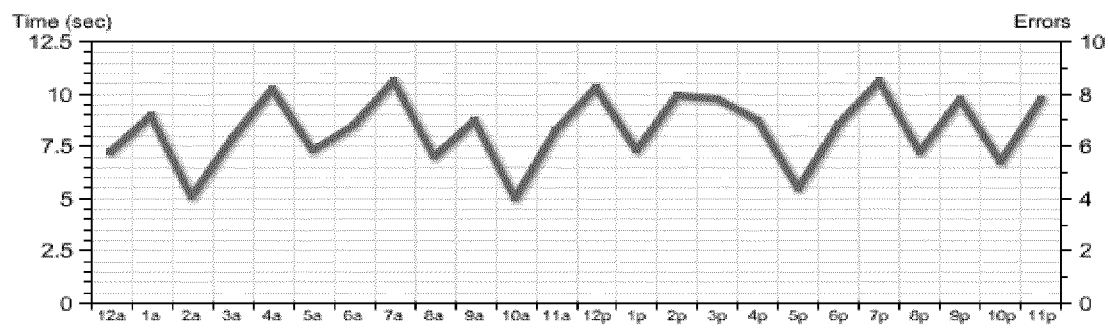
FIG. 3 is a graph diagram illustrating an example monitoring result showing raw load time data according to an embodiment of the present invention.

FIG. 3 is a graph diagram illustrating an example monitoring result showing raw load time data according to an embodiment of the present invention. In the illustrated embodiment, the graph shows the raw load times at various monitor agents for a target website. This particular data set does not reflect baseline agent measurements, does not reflect the increased sample frequency of baseline agents, and also does not account for performance variation.

Figure 4:
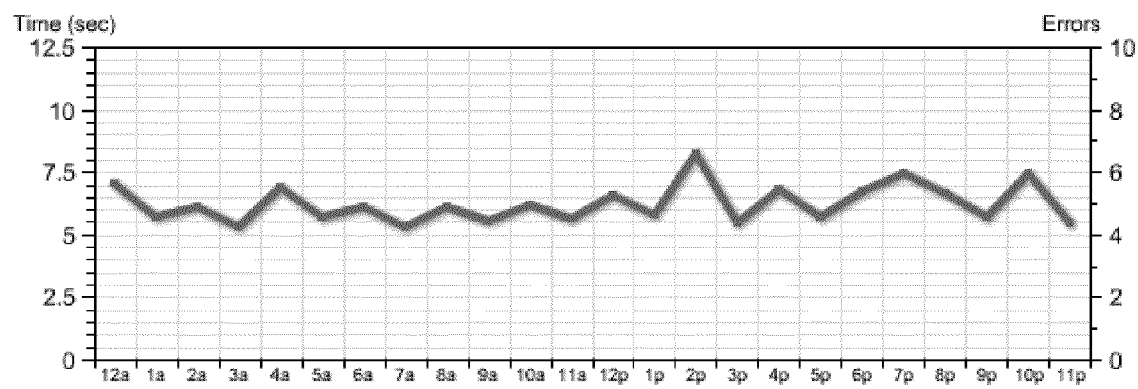
FIG. 4 is a graph diagram illustrating an example monitoring result showing baseline load time data for the data set shown in FIG. 3 according to an embodiment of the present invention.

FIG. 4 is a graph diagram illustrating an example monitoring result showing baseline load time data for the data set shown in FIG. 3 according to an embodiment of the present invention. In the illustrated embodiment, the graph shows the load times for the same web page using an increased sample frequency for identified baseline agents. Accordingly, in comparison with the graph in FIG. 3, the graph in FIG. 4 shows considerable improvement in the variations of load times for the website. This is advantageously the result of minimizing the effects of network latency on website performance data.

For example, in FIG. 3, a load time from a monitoring agent in Paris is equally weighted with the load time from a monitoring agent in Los Angeles, regardless of the proximity of either monitoring agent to the target website. However, if the target website is in San Diego then the natural latency for the monitoring agent in Paris would cause the load time there to be significantly higher than the monitoring agent in Los Angeles. Thus, the data sample shown in FIG. 3 is inaccurate, while the data sample shown in FIG. 4 is more accurate pursuant to the higher sample frequency of the baseline agents, of which Los Angeles is one and Paris is not one.

Figure 5:
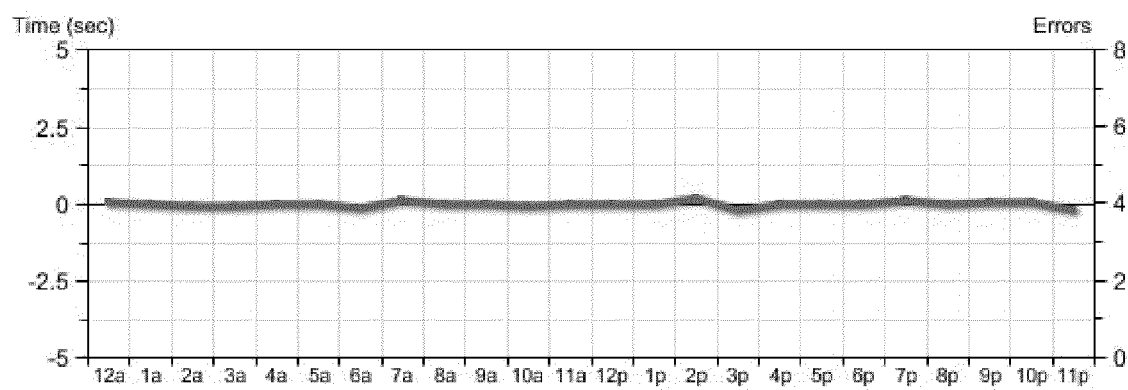
FIG. 5 is a graph diagram illustrating an example monitoring result showing performance variation load time data for the data set shown in FIG. 3 according to an embodiment of the present invention.

Furthermore, additional advantages are realized by isolating performance variation for each monitoring agent and baseline agent. FIG. 5 is a graph diagram illustrating an example monitoring result showing performance variation load time data for the data set shown in FIG. 3 according to an embodiment of the present invention. In the illustrated embodiment, the performance variation for any given monitor agent or baseline agent is compared to its own historical average so that the significant information captured by the agent is relative to the change in load time against the average load time for the particular agent. It should be understood that although load time is used herein as the primary example metric, alternative metrics can also be used.

A significant benefit of performance variation for a monitor agent is that the effect of network latency can be substantially reduced by comparing metrics such as load time to a historical average for the particular monitor agent. Thus, a load time of 10 seconds for a web page that averages a load time of 12 seconds is an improvement—even if the average load time across all agents for the web page is 3 seconds. Advantageously, performance variation can be used in conjunction with baseline agents when monitoring websites or used with non-baseline monitor agents or a combination of both baseline and non-baseline monitor agents.

FIG. 6 is a flow diagram illustrating an example process for increasing the sample rate for baseline agents according to an embodiment of the present invention. The process may be carried out by the system shown and described with respect to FIG. 1. Initially, in step 300 the system identifies a set of monitor agents for use in the website monitoring effort. Alternative embodiments may range from a handful of monitor agents to several hundred monitor agents. The monitor agents can be geographically dispersed in order to monitor the target website from a variety of global locations. In one embodiment, the monitor agents are selected based on the geographical location of a target demographic audience for the target website to be monitored.

Next, in step 305, from the identified set of monitor agents, a subset of baseline agents is created. The subset may be manually selected by an administrator or it may be dynamically created. In one embodiment, the baseline agents may be selected by a pre-monitoring test that identifies those agents with the fastest response times from the target website. For example, using the fastest response times (e.g., in milliseconds) may correctly identify those monitor agents that are physically closest to the target website with all other factors (e.g., network latency) being equal.

In an alternative embodiment, the baseline agents may be selected by a pre-monitoring test that identifies those monitor agents with the least variation in response times, for example using the performance variation technique. Performance variation may also be used in combination with the fastest response times in order to optimize the set of monitor agents that become the baseline agents. Advantageously, the set of baseline agents can be selected in a fashion that mitigates the presence of network latency in the sample of the monitor agents identified in step 300.

Once the monitor agents and baseline agents have been identified, a first monitor agent (i.e., non-baseline agent) is selected in step 310. Next, in step 315 the target website is monitored from all of the baseline agents and the selected monitor agent in a first round of the overall monitoring effort. If there are additional monitor agents that have not been monitored from in the first round, as determined in step 320, (i.e., non-baseline agents) then the process loops back and selects another monitor agent and proceeds to monitor the target website from each of the baseline agents and the newly selected monitor agent. Through this round robin type of monitoring, the target website is monitored much more frequently from the baseline agents than from the monitor agents.

After each of the monitor agents (i.e., non-baseline agent) have been selected in the particular round and the target website has been monitored from each of the monitor agents, the system determines in step 325 if the monitoring protocol calls for another round of monitoring. For example, another round of sampling may be called for if there was an error or if redundant samples are desired. If another round is scheduled, the process returns to step 310 where a first monitoring agent is again selected and proceeds to monitor the target website from each monitor agent one time for the round and from each baseline agent a plurality of times for the round. If another round is not scheduled, then a report for the monitored target website can be compiled, as shown in step 330. In one embodiment, compiling a report may include recording the performance of the monitoring sample that is then later compiled with previous and/or subsequent monitoring samples to generate a report over time.

FIG. 7 is a flow diagram illustrating an alternative example process for increasing the sample rate for baseline agents according to an embodiment of the present invention. The process may be carried out by the system shown and described with respect to FIG. 1. Initially, in step 400, the total number of monitor agents (non-baseline agents) is identified. This total number can be identified by the variable X in this process. In this particular process, it is advantageous to have a ratio of baseline agents to non-baseline monitor agents that is less than one to one. For example, a total agent set having three baseline agents and fifteen monitor agents may be desirable. This is because the target website is monitored successively from a baseline agent and a non-baseline monitor agent in an interleaved fashion such that the set of baseline agents is repeated much more frequently than the set of non-baseline monitor agents.

Next, in step 405 a variable called COUNT is set to the value of X. In step 410, the target website is monitored from a baseline agent. In the first instance, this can be any of the baseline agents and in subsequent instances this is the next baseline agent in the set of baseline agents. After monitoring from a baseline agent, the system then monitors the target website from a monitor agent (i.e. non-baseline agent), as shown in step 415. This first monitor agent can be referred to as monitor agent (COUNT), which indicates that this is the monitor agent that corresponds to the variable COUNT. Next, in step 420 the variable COUNT is decreased by one and if the variable COUNT is equal to zero, as determined in step 425, then the current round is complete.

If the variable COUNT is not equal to zero, then the process returns to step 410 where the target website is monitored from the next baseline agent followed by monitoring from the next monitor agent and so forth until the target website has been monitored from each of the monitor agents. Because there are more monitor agents than baseline agents, monitoring from the baseline agents will take place more than once in a loop fashion until each of the monitor agents have been used for monitoring the website. As can be understood, implementation of this process causes the target website to be monitored one time per round from each of the monitor agents and also causes the target website to be monitored a plurality of times from each of the baseline agents to effectively increase the sample rate from the baseline agents.

Furthermore, after a round of monitoring is complete (one round comprises monitoring the target website from each monitor station one time), additional rounds may be initiated as determined in step 430. For example, another round of sampling may be called for if there was an error or if redundant monitoring samples are desired. When all of the rounds of monitoring are complete, then a report for the monitored target website can be compiled, as shown in step 435. In one embodiment, compiling a report may include recording the performance of the monitoring sample that is then later compiled with previous and/or subsequent monitoring samples to generate a report over time.

Figure 8:
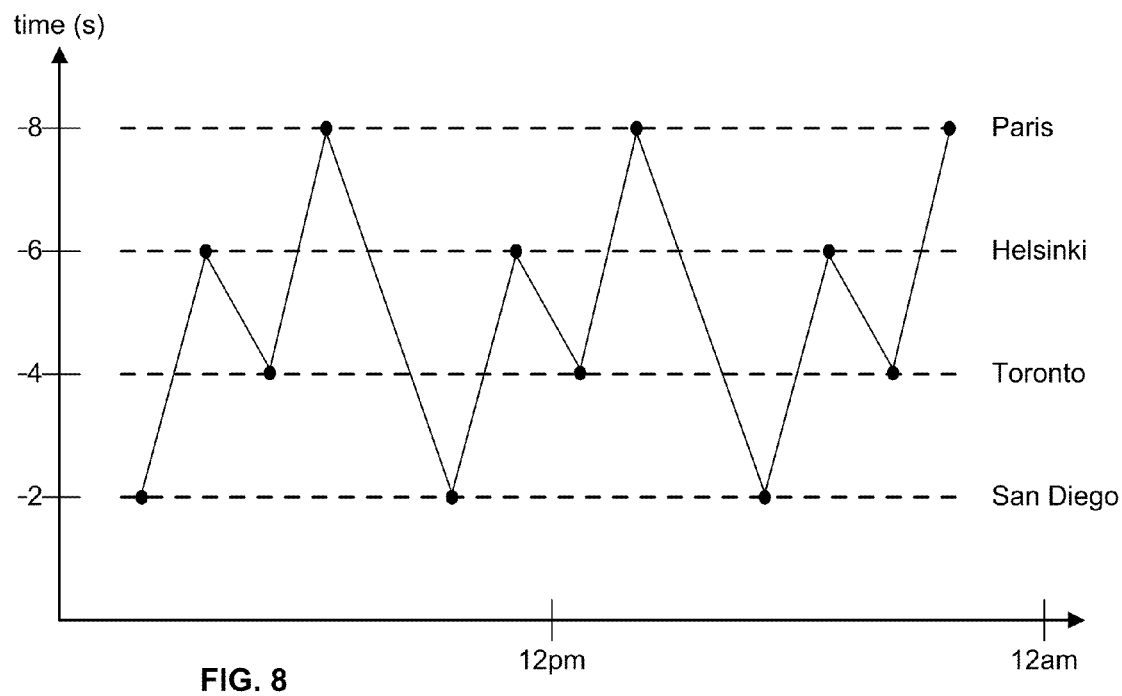
FIG. 8 is a graph diagram illustrating an example raw data set for website load times from various city locations around the globe according to an embodiment of the present invention.

FIG. 8 is a graph diagram illustrating an example raw data set for website load times from various city locations around the globe according to an embodiment of the present invention. In the illustrated embodiment the raw load times are shown for a target website from monitor agents in various cities. If each city was equally weighted, then the average load time for the website would be 5 seconds. However, if the San Diego and Toronto monitor agents were given additional weight as baseline agents, the average load time for the website could go down to less than three seconds, depending on how much additional weight was given and to which specific agents the additional weighting was applied. For example, the various baseline agents can be treated differently depending on their relative ability to accurately monitor the target website.

Figure 9:
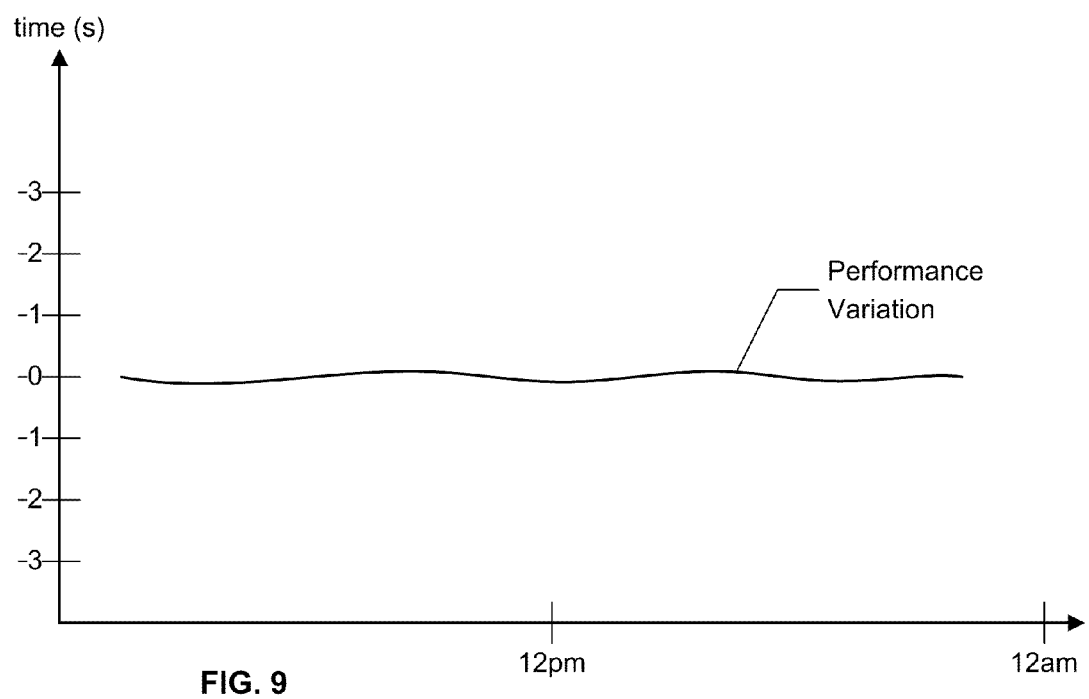
FIG. 9 is a graph diagram illustrating an example performance variation presentation for the data set in FIG. 8 according to an embodiment of the present invention.

FIG. 9 is a graph diagram illustrating an example performance variation presentation for the data set in FIG. 8 according to an embodiment of the present invention. In the illustrated embodiment, although the raw load times for the various cities in FIG. 8 were quite different, the relative change in load times for each city was very nearly zero. Thus, according to the performance variation, each of these cities would make a good candidate for a baseline agent. In one embodiment, the subset of monitor agents that are used as baseline agents may be dynamically selected from a sampling of all monitor agents and a selection based on optimum performance variation.

Figure 10:
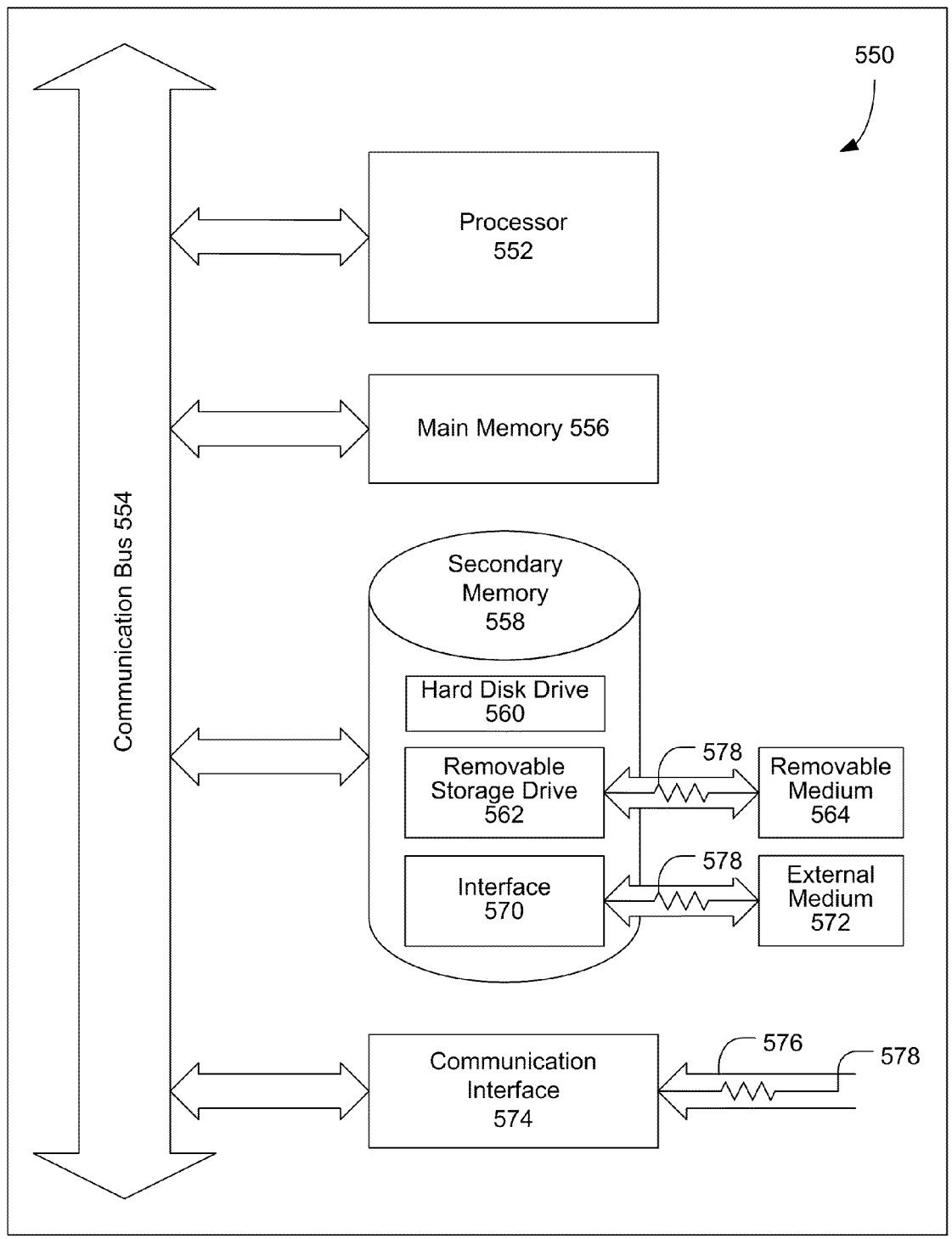
FIG. 10 is a block diagram illustrating an exemplary computer system as may be used in connection with various embodiments described herein.

FIG. 10 is a block diagram illustrating an exemplary computer system 550 that may be used in connection with the various embodiments described herein. For example, the computer system 550 may be used in conjunction with a monitor agent, baseline agent, controller server, or target website as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer implemented method for monitoring a target website from a monitoring server that is communicatively coupled with the target website via a data communication network, the method comprising:
dividing a plurality of agents into baseline agents and monitor agents based on a proximity to the target website, wherein each monitor agent is less proximate to the target website than any baseline agent; and
monitoring the target website in a plurality of monitoring rounds that are weighted in favor of the baseline agents by, in each monitoring round, monitoring the target website from each baseline agent and from at least one of the monitor agents.

2. The method of claim 1, wherein the proximity is a geographical proximity.

3. The method of claim 1, wherein the proximity is a network latency.

4. The method of claim 1, wherein the proximity is a packet round trip time.

5. The method of claim 1, wherein dividing the plurality of agents comprises identifying those agents having the most reliable responses to a series of network communication tests with the target website to determine the baseline agents.

6. The method of claim 5, wherein the most reliable responses are those responses having the fastest network round trip time.

7. The method of claim 5, wherein the most reliable responses are those responses having the least performance variation in website load time.

8. The method of claim 1, further comprising generating a metric for each of the plurality of agents, wherein the metric comprises a comparison of a measured performance of the agent to the historical average performance of the agent, and wherein dividing the plurality of agents into baseline agents and monitor agents based on a proximity to the target website comprises selecting the baseline agents based on the metric.

9. The method of claim 1, wherein each monitoring round comprises:
monitoring the target website from each baseline agent;
selecting at least one, but not all, of the monitor agents based on a round-robin technique; and
monitoring the target website from the selected monitor agents.

10. A system for monitoring a target website via a data communication network, the system comprising:
at least one hardware processor; and
a controller communicatively coupled with a plurality of agents, wherein the controller, when executed by the at least one hardware processor,
divides the plurality of agents into baseline agents and monitor agents based on a proximity to the target website, wherein each monitor agent is less proximate to the target website than any baseline agent, and
monitors the target website in a plurality of monitoring rounds that are weighted in favor of the baseline agents by, in each monitoring round, monitoring the target website from each baseline agent and from at least one of the monitor agents.

11. The system of claim 10, wherein the proximity is a geographical proximity.

12. The system of claim 10, wherein the proximity is a network latency.

13. The system of claim 10, wherein the proximity is a packet round trip time.

14. The system of claim 10, wherein the controller divides the plurality of agents by identifying those agents having the most reliable responses to a series of network communication tests with the target website to determine the baseline agents.

15. The system of claim 14, wherein the most reliable responses are those responses having the fastest network round trip time.

16. The system of claim 14, wherein the most reliable responses are those responses having the least performance variation in website load time.

17. A system for monitoring a target website from a monitoring server that is communicatively coupled with the target website via a data communication network, the system comprising:

means for dividing a plurality of agents into baseline agents and monitor agents based on a proximity to the target website, wherein each monitor agent is less proximate to the target website than any baseline agent; and means for monitoring the target website in a plurality of monitoring rounds that are weighted in favor of the baseline agents by, in each monitoring round, monitoring the target website from each baseline agent and from at least one of the monitor agents.

18. The system of claim 17, wherein the proximity is a geographical proximity.

19. The system of claim 17, wherein the proximity is a network latency.

20. The system of claim 17, wherein the proximity is a packet round trip time.

21. The system of claim 17, wherein the means for dividing a plurality of agents comprises means for performing a series of network communication tests with the target website and means for identifying agents having the most reliable responses to said series of network communication tests to determine the baseline agents.

22. The system of claim 21, wherein the most reliable responses are those responses having the fastest network round trip time.

23. The system of claim 21, wherein the most reliable responses are those responses having the least performance variation in website load time.

\* \* \* \* \*